US 8,339,658 B2

(12) United States Patent
Tao

(10) Patent No.: US 8,339,658 B2
(45) Date of Patent: Dec. 25, 2012

(54) IMAGE FORMING APPARATUS AND IMAGE FORMING METHOD

(75) Inventor: Kozo Tao, Osaka (JP)

(73) Assignee: KYOCERA Document Solutions Inc. (JP)

( * ) Notice: Subject to any disclaimer, the term of this patent is extended or adjusted under 35 U.S.C. 154(b) by 498 days.

(21) Appl. No.: 12/695,610

(22) Filed: Jan. 28, 2010

(65) Prior Publication Data

US 2010/0231931 A1 Sep. 16, 2010

(30) Foreign Application Priority Data

Mar. 11, 2009 (JP) ................................ 2009-057999

(51) Int. Cl.
| G06F 3/12 | (2006.01) |
| G06F 15/00 | (2006.01) |
| G06K 3/12 | (2006.01) |
| G06K 15/02 | (2006.01) |
| G06K 9/54 | (2006.01) |
| H03B 1/66 | (2006.01) |
| G09G 5/36 | (2006.01) |

(52) U.S. Cl. ........ 358/1.6; 358/1.1; 358/1.13; 358/1.15; 358/1.11; 382/303; 375/240.16; 345/559

(58) Field of Classification Search .................. 358/1.1, 358/1.13, 1.6, 1.15, 1.11; 382/303; 375/240.16; 345/539

See application file for complete search history.

(56) References Cited

U.S. PATENT DOCUMENTS

| 5,732,198 A * | 3/1998 | Deppa et al. ................. 358/1.15 |
| 6,601,020 B1 * | 7/2003 | Myers ........................... 702/186 |
| 7,167,263 B2 * | 1/2007 | Takayama et al. ........... 358/1.15 |
| 7,613,833 B2 * | 11/2009 | Odaira et al. ................. 709/246 |
| 7,630,585 B2 * | 12/2009 | Abel et al. .................... 382/303 |
| 2005/0286633 A1 * | 12/2005 | Abel et al. ............... 375/240.16 |
| 2006/0061582 A1 * | 3/2006 | Kurupati et al. ............. 345/559 |
| 2010/0231931 A1 * | 9/2010 | Tao ................................. 358/1.6 |

FOREIGN PATENT DOCUMENTS

| JP | 09-205541 | 8/1997 |
| JP | 09-294176 | 11/1997 |
| JP | 11-177788 | 7/1999 |
| JP | 11-327859 | 11/1999 |
| JP | 2000-138823 | 5/2000 |

* cited by examiner

Primary Examiner — Akwasi M Sarpong
(74) Attorney, Agent, or Firm — McDonnell Boehnen Hulbert & Berghoff LLP

(57) ABSTRACT

An image forming apparatus including: a video memory; a load management unit that loads page data on a print image into the video memory page by page; a print engine that performs printing using the page data stored in the video memory; and a main management unit that, when printing of a page is completed as part of an electronic sort process, causes the video memory to retain the page data if there is a subsequent page to be printed using the same page data as that on the page, and deletes the page data from the video memory if there is no subsequent page to be printed using the same page data as that on the page.

15 Claims, 7 Drawing Sheets

| PRINT PAGE P | DOCUMENT PAGE DP |
|---|---|
| 1 | 1 |

(B)

| PRINT PAGE P | DOCUMENT PAGE DP |
|---|---|
| 1 | 1 |
| 2 | 2 |
| 3 | 1 |
| 4 | 2 |

(C)

| PRINT PAGE P | DOCUMENT PAGE DP |
|---|---|
| 2 | 2 |
| 3 | 1 |
| 4 | 2 |

(D)

| PRINT PAGE P | DOCUMENT PAGE DP |
|---|---|
| 3 | 1 |
| 4 | 2 |

THE FIRST PRINT PAGE (P=1, DP=1)

THE SECOND PRINT PAGE (P=2, DP=2)

THE THIRD PRINT PAGE (P=3, DP=1)

THE FOURTH PRINT PAGE (P=4, DP=2)

IMAGE FORMING APPARATUS AND IMAGE FORMING METHOD

INCORPORATION BY REFERENCE

This application is based upon and claims the benefit of priority from corresponding Japanese Patent Application No. 2009-057999, filed Mar. 11, 2009, the entire contents of which is incorporated herein by reference.

BACKGROUND OF THE INVENTION

1. Field of the Invention

The present invention relates to an image forming apparatus and method.

2. Description of the Related Art

There is an image forming apparatus having an electronic sort function used when printing a plurality of copies of a document.

In the electronic sort function for a print engine, page data on print images is generated for all of a plurality of document pages included in a specified job, and the page data on those print images is temporarily stored in a mass storage device such as a hard disk drive (HDD) or a random access memory (RAM) disk drive, and loaded into a video memory according to a printing order to thereby execute printing thereof. For example, in a case where two copies of a two-page document are printed, the page data on the two pages is first generated and stored in the mass storage device. (a) Then, the page data corresponding to the first page of the first copy is loaded into the video memory and printed, and after completion of the printing, the corresponding page data is deleted from the video memory. (b) Then, the page data corresponding to the second page of the first copy is loaded into the video memory and printed, and after completion of the printing, the corresponding page data is deleted from the video memory. (c) Then, the page data corresponding to the first page of the second copy is loaded into the video memory and printed, and after completion of the printing, the corresponding page data is deleted from the video memory. (d) Then, the page data corresponding to the second page of the second copy is loaded into the video memory and printed, and after completion of the printing, the corresponding page data is deleted from the video memory.

However, according to the above-mentioned art, each time one page is printed, the page data is loaded into the video memory from a low-speed mass storage device that takes much time in reading data. Accordingly, it takes a long time to process a printing request when using an electronic sort function.

SUMMARY OF THE INVENTION

According to an embodiment of the present invention, an image forming apparatus comprises: a video memory; a load management unit that loads page data on a print image into the video memory page by page; a print engine that performs printing by using the page data stored in the video memory; and a main management unit that, when the printing of a page is completed as part of an electronic sort process, causes the video memory to retain the page data if there is a subsequent page to be printed using the page data, and deletes the page data from the video memory if there is no subsequent page to be printed using the page data.

According to another embodiment of the present invention, an image forming method comprises: a loading step of loading page data on a print image into a video memory page by page; a printing step of printing by using the page data stored in the video memory; and a video memory management step of, when printing of a page is completed, retaining the page data if there is a subsequent page to be printed using the same page data, and deleting the page data from the video memory if there is no subsequent page to be printed using the same page data.

Additional features and advantages are described herein, and will be apparent from the following Detailed Description and the figures.

BRIEF DESCRIPTION OF THE FIGURES

In the accompanying drawings:

FIGS. 5A to 5D are diagrams illustrating examples of a process-waiting page list;

DETAILED DESCRIPTION OF THE PREFERRED EMBODIMENT

Figure 1:
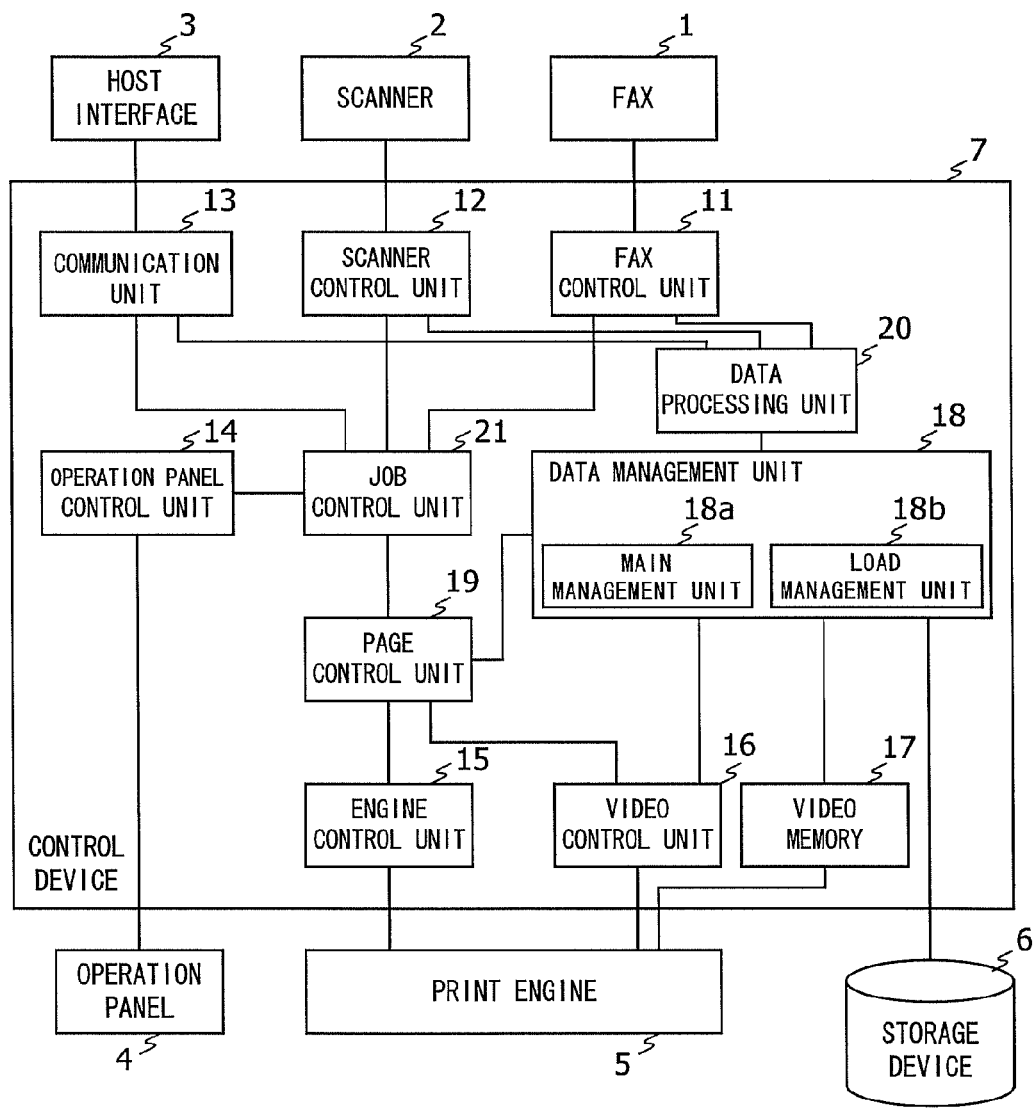
FIG. 1 is a block diagram illustrating a configuration of an image forming apparatus according to an embodiment of the present invention.

FIG. 1 is a block diagram illustrating a configuration of an image forming apparatus according to an embodiment of the present invention. The image forming apparatus has an electronic sort function.

In FIG. 1, a facsimile apparatus 1, which includes a modem connected to a communication network, generates facsimile data from image data and transmits the facsimile data through the modem. Further, the facsimile apparatus 1 receives facsimile data through the modem and generates image data from the facsimile data.

A scanner 2 is an apparatus that reads an image of an original and outputs image data therefrom.

A host interface 3 is a communication device for performing data communications with a host computer and receiving a print request. Examples of the host interface 3 to be used include peripheral equipment interfaces such as a network interface and a universal serial bus (USB). The print request transmitted by the host computer is received by the host interface 3.

An operation panel 4 is disposed on a surface of a casing, and includes a display device that displays various messages to a user and an input device that detects the user's operation. The display device could be, for example, a liquid crystal display. The input device could be, for example, a touch panel or a key switch. For example, an execution instruction for a copy job involving use of the scanner 2 could be input by the user to the input device of the operation panel 4.

A print engine 5 is an apparatus that prints an image onto a paper sheet based on page data on a print image.

A storage device 6 is a mass data storage device such as a hard disk drive or a RAM disk drive. When the page data on the print image of the document page is generated by a control device 7 from image data accompanied by the print request, the page data is temporarily stored in the storage device 6.

The control device 7 is a device that controls the facsimile apparatus 1, the scanner 2, the host interface 3, the operation panel 4, the print engine 5, and the storage device 6, and performs various data processings. The control device 7, which includes a central processing unit (CPU), a read only memory (ROM), and a random access memory (RAM), loads programs stored in the ROM, the storage device 6, and the like into the RAM and executes the programs using the CPU to thereby implement the various processing units described below.

On the control device 7, a FAX control unit 11, a scanner control unit 12, a communication unit 13, an operation panel control unit 14, an engine control unit 15, a video control unit 16, a data management unit 18, a page control unit 19, a data processing unit 20, and a job control unit 21 are implemented. In addition, a partial storage area of the RAM of the control device 7 is used as a video memory 17.

The FAX control unit 11 controls the facsimile apparatus 1 to acquire the image data generated through facsimile reception from the facsimile apparatus 1.

The scanner control unit 12 controls the scanner 2 to acquire the image data generated through original reading from the scanner 2.

The communication unit 13 controls the host interface 3 to acquire the print request received by the host interface 3. The print request includes, for example, printing data described in page description language (PDL).

The operation panel control unit 14 controls the operation panel 4 to cause messages to be displayed on the display device of the operation panel 4 and to acquire information about the user's operation through the input device of the operation panel 4. For example, if an execution command for a copy job is input to the operation panel 4, the operation panel control unit 14 instructs the job control unit 21 to execute the copy job. In the copy job, the page data on the print image is generated from the image data generated by the scanner 2 and printed.

The engine control unit 15 controls the print engine 5.

The video control unit 16 sets up the page data on the print image to be supplied to the print engine 5. For example, the video control unit 16 supplies an address of the page data to be processed to the print engine 5, or if the page data is compressed, causes a decoder to perform decompression of the page data before the print engine 5 uses the page data.

The video memory 17 is a storage area into which the page data on the print image is loaded from the storage device 6. The video memory 17 allows access at higher speed than the storage device 6. But the storage area of the video memory 17 is smaller than the storage area of the storage device 6.

The data management unit 18 performs input/output of print image data to/from the storage device 6 and the video memory 17. The data management unit 18 includes a main management unit 18a and a load management unit 18b.

In response to a load request and a deletion request received from the page control unit 19, the main management unit 18a uses the load management unit 18b to load the page data into the video memory 17 and delete the page data from the video memory 17, respectively.

During the electronic sort process, when printing of a page is completed, the main management unit 18a does not delete the page data on the page from the video memory 17 if there is a subsequent page to be printed using the same page data as that on the page. If, on the other hand, there is no subsequent page to be printed using the same page data as that on the page, the main management unit 18a deletes the page data on the page from the video memory 17.

If page data on a page specified by the load request received from the page control unit 19 has not been loaded in the video memory 17, the main management unit 18a causes the load management unit 18b to load the page data into the video memory 17. If, on the other hand, the page data on the page specified by the load request has been loaded in the video memory 17 and has not been deleted, the main management unit 18a ignores the load request.

The main management unit 18a registers, in a process-waiting page list, a record indicating a correlation between a print page number and a document page number specified in the load request. The print page number represents a serial number of a print page, and the document page number represents a page number of the page data used for the printing.

Once the load request is issued, if the document page number specified in the load request is not registered in the process-waiting page list, the main management unit 18a causes the load management unit 18b to load the corresponding page data into the video memory 17. If, on the other hand, the document page number specified in the load request has already been registered in the process-waiting page list, the main management unit 18a ignores the load request.

When the printing of a page is completed, the main management unit 18a deletes the record of the print page number of the page from the process-waiting page list. At that time, if there is a record having the same document page number as the page within the process-waiting page list, the main management unit 18a does not delete the page data on the page from the video memory 17. If, however, there is no record having the same document page number as the page within the process-waiting page list, the main management unit 18a deletes the page data on the page from the video memory 17.

The load management unit 18b loads the page data on the print image into the video memory 17 from the storage device 6 page by page.

Upon reception of the print request from the job control unit 21, the page control unit 19 issues the load request for the page data page by page. Each time the printing of one page is completed, the page control unit 19 issues the deletion request for the page data on the completed page. The page control unit 19 issues the load request for a given page, and loads the page data on the given page. Once the loading of the page data on the given page is complete, the page control unit 19 issues the load request for the next page.

The data processing unit 20 generates print image data that can be processed by the print engine 5 from the image data acquired by the FAX control unit 11 and the scanner control unit 12. The data processing unit 20 performs processes such as color conversion and halftoning, as appropriate.

The job control unit 21 manages print jobs generated by the print requests received from the host computer, and those received through copying, facsimile reception, and the like, and executes the print jobs in the order received. The job control unit 21 issues the print request for each of the pages included in the print job to the page control unit 19.

Described next is an operation of the above-mentioned image forming apparatus.

Figure 2:
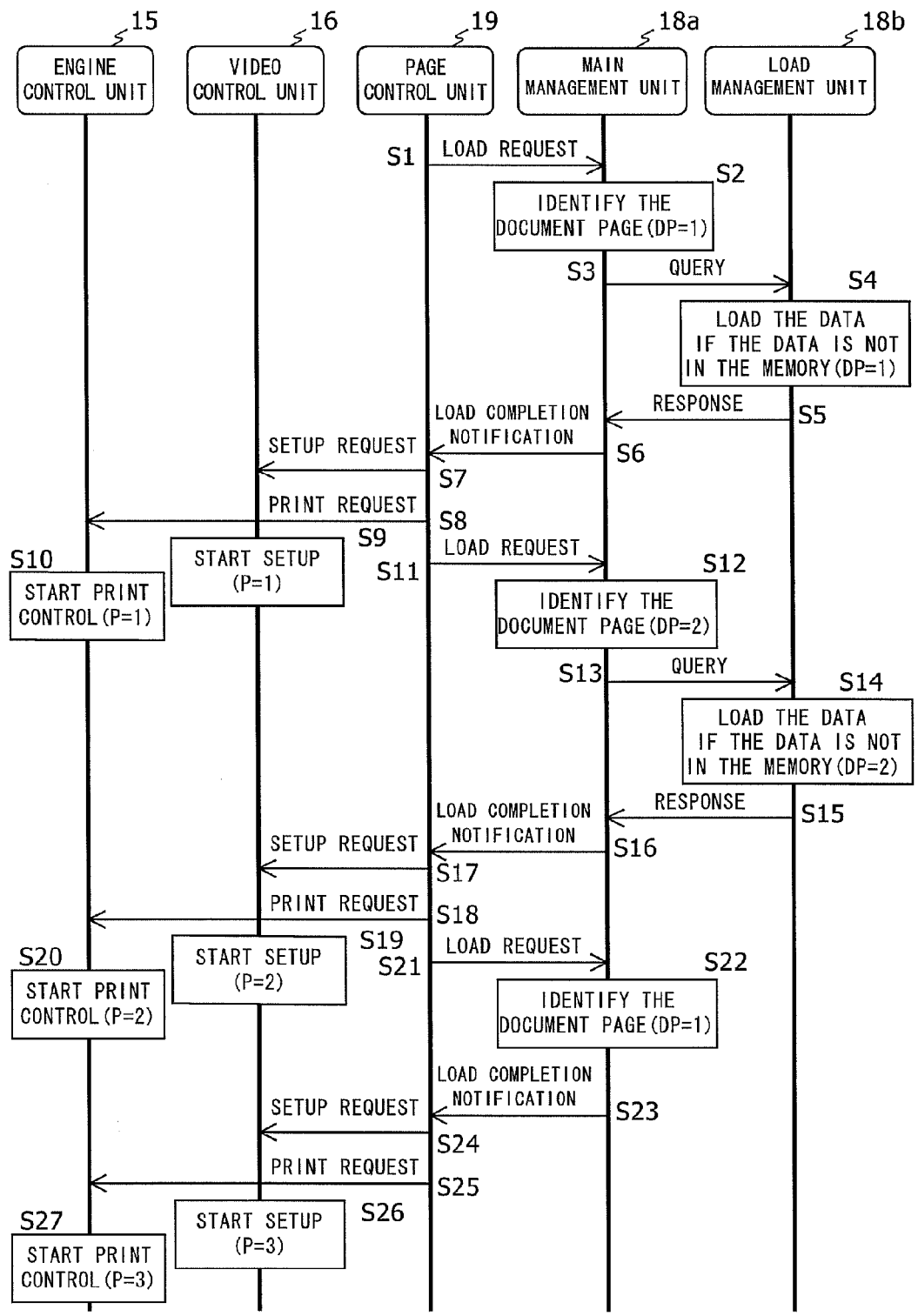
FIG. 2 is a sequence diagram (1/3) illustrating an example of an electronic sort process performed by the image forming apparatus illustrated in FIG. 1.
Figure 3:
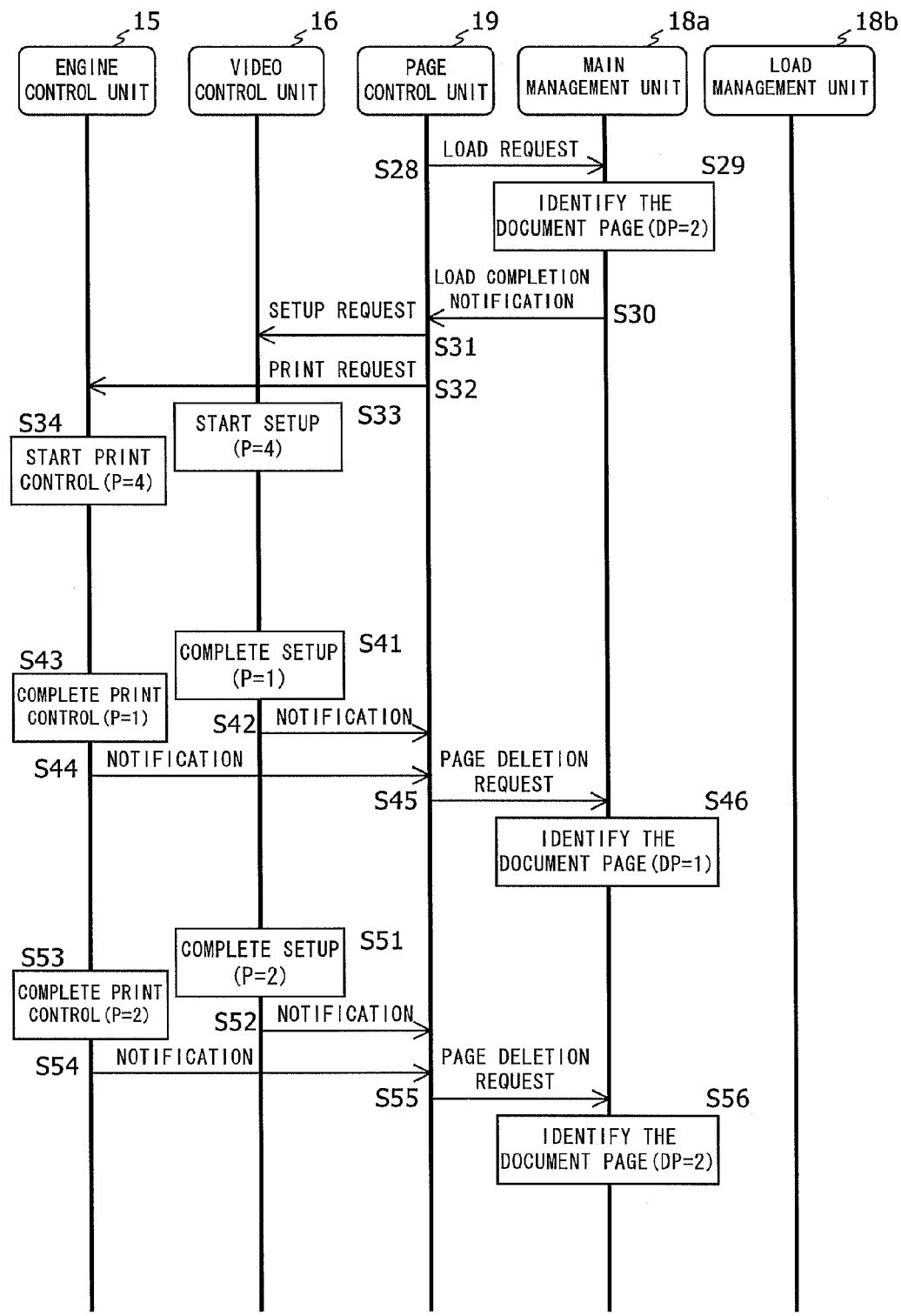
FIG. 3 is a sequence diagram (2/3) illustrating the example of the electronic sort process performed by the image forming apparatus illustrated in FIG. 1.
Figure 4:
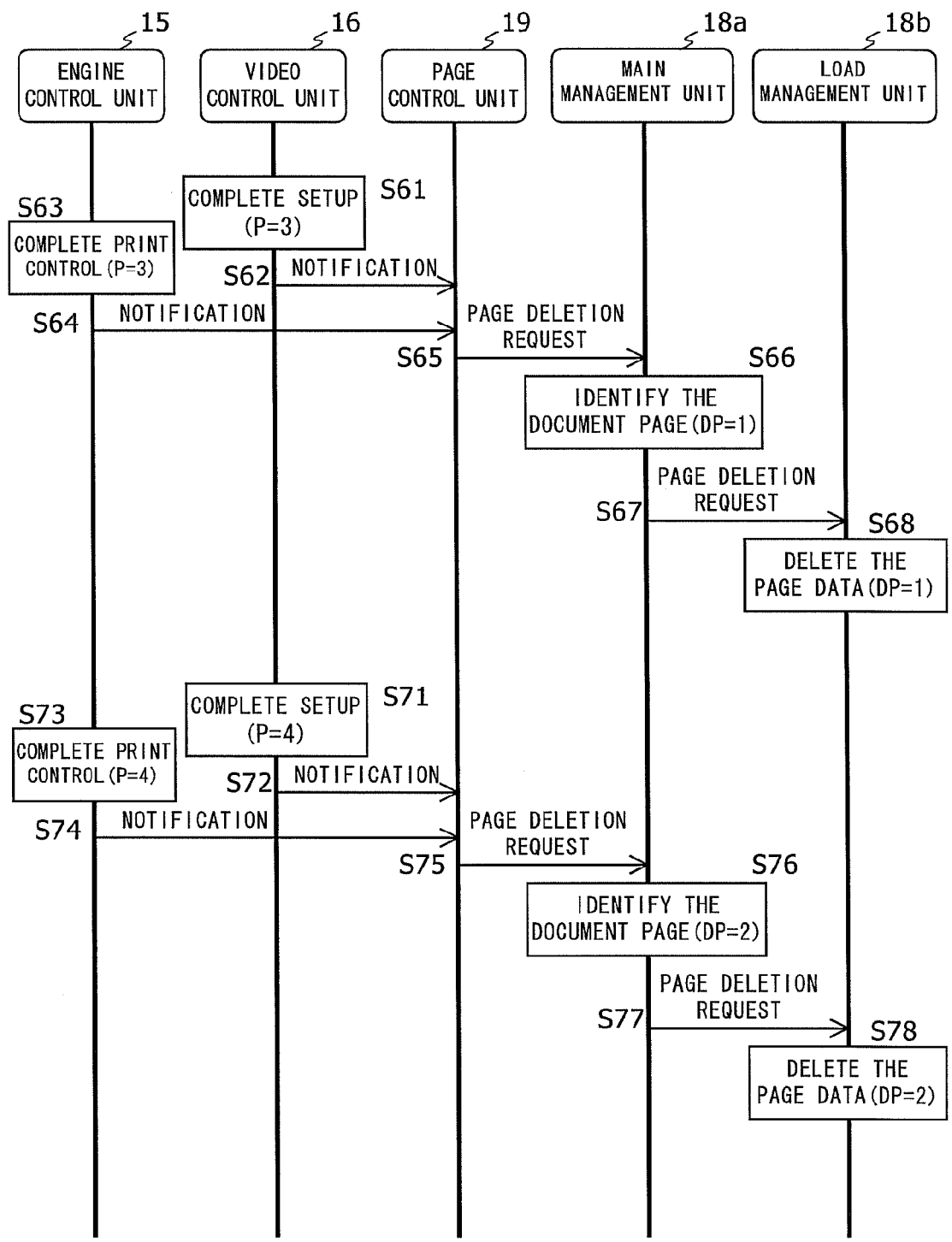
FIG. 4 is a sequence diagram (3/3) illustrating the example of the electronic sort process performed by the image forming apparatus illustrated in FIG. 1.

Described here is the operation performed in a case where two copies of a two-page document are printed using the electronic sort process. FIGS. 2 to 4 are sequence diagrams illustrating an example of an electronic sort process performed by the image forming apparatus illustrated in FIG. 1.

FIGS. 5A to 5D are diagrams illustrating examples of the process-waiting page list managed by the main management unit 18a.

If there is a print request, the page data on a print image is generated by the data processing unit 20 and stored into the storage device 6 by the data management unit 18. In the case of a print request for printing two copies of a two-page document using the electronic sort process, the page data on the first page and on the second page of the document is stored in the storage device 6.

Then, the job control unit 21 supplies the load request regarding a first print page (print page number P=1) to the main management unit 18a (Step S1). The main management unit 18a identifies the document page corresponding to the first print page as the first document page (document page number DP=1) (Step S2). Then, the main management unit 18a sets the print page number P to "1", and adds a record with the document page number DP being set to "1" to the process-waiting page list. The process-waiting page list obtained at this time is as illustrated in FIG. 5A.

The print page represents a page to be printed. The print page number represents a serial number of the print page. The document page represents a page of the document (that is, print image). The document page number represents a serial number of the document page. Therefore, in the case of the print request for printing two copies of a two-page document by using the electronic sort process, the page data on a first document page is used for the printing of the first print page. The page data on a second document page is used for the printing of a second print page. The page data on the first document page is used again for the printing of a third print page. The page data on the second document page is also used again for the printing of a fourth print page.

Then, the main management unit 18a issues a query to the load management unit 18b as to whether or not the page data on the first document page has been loaded in the video memory 17 (Step S3). Upon reception of the query, if the page data on the first document page has not been loaded in the video memory 17, the load management unit 18b loads the page data into the video memory 17, and then transmits a response to the query to the main management unit 18a (Step S5). On the other hand, if, upon reception of the query, the page data on the first document page has already been loaded in the video memory 17, the load management unit 18b immediately transmits the response to the query to the main management unit 18a (Step S5).

That is, when the main management unit 18a receives the response from the load management unit 18b, it is guaranteed that the page data related to the query has been loaded in the video memory 17.

Then, upon reception of the response regarding the page data on the first document page from the load management unit 18b, the main management unit 18a transmits a load completion notification to the page control unit 19 (Step S6).

Upon reception of the load completion notification for the first print page (P=1), the page control unit 19 transmits a setup request for the first print page (P=1) to the video control unit 16 (Step S7). The page control unit 19 transmits a print start request for the first print page (P=1) to the engine control unit 15 (Step S8). Upon reception of the setup request for the first print page (P=1), the video control unit 16 starts setup for the first print page (P=1) (Step S9). Upon reception of the print start request for the first print page (P=1), the engine control unit 15 reads the page data from the video memory 17, and starts print control for the first print page (P=1) (Step S10).

Meanwhile, immediately after transmitting the setup request and the print start request for the first print page (P=1), the page control unit 19 supplies the load request regarding the second print page (P=2) to the main management unit 18a (Step S11). The main management unit 18a identifies a document page corresponding to the second print page as the second document page (DP=2) (Step S12). Then, the main management unit 18a sets the print page number to "2", and adds a record with the document page number being set to "2" to the process-waiting page list.

Then, the main management unit 18a issues a query to the load management unit 18b as to whether or not the page data on the second document page has been loaded in the video memory 17 (Step S13). Upon reception of the query, if the page data on the second document page has not been loaded in the video memory 17, the load management unit 18b loads the page data into the video memory 17, and then transmits a response to the query to the main management unit 18a (Step S15). On the other hand, if, upon reception of the query, the page data on the second document page has already been loaded in the video memory 17, the load management unit 18b immediately transmits the response to the query to the main management unit 18a (Step S15). Then, upon reception of the response regarding the page data on the second document page from the load management unit 18b, the main management unit 18a transmits a load completion notification to the page control unit 19 (Step S16).

Upon reception of the load completion notification for the second print page (P=2), the page control unit 19 transmits the setup request for the second print page (P=2) to the video control unit 16 (Step S17). The page control unit 19 transmits the print start request for the second print page (P=2) to the engine control unit 15 (Step S18). Upon reception of the setup request for the second print page (P=2), the video control unit 16 starts the setup for the second print page (P=2) (Step S19). Upon reception of the print start request for the second print page (P=2), the engine control unit 15 reads the page data from the video memory 17, and starts the print control for the second print page (P=2) (Step S20).

Meanwhile, immediately after transmitting the setup request and the print start request for the second print page (P=2), the page control unit 19 supplies the load request regarding the third print page (P=3) to the main management unit 18a (Step S21). The main management unit 18a identifies a document page corresponding to the third print page as the first document page (DP=1) (Step S22). At this time, the record containing the first document page (DP=1) (record added in Step S2) is contained in the process-waiting page list. Therefore, the main management unit 18a ignores the load request, and without issuing a query to the load management unit 18b, transmits the load completion notification to the page control unit 19 (Step S23). Then, the main management unit 18a sets the print page number to "3", and adds a record with the document page number being set to "1" to the process-waiting page list.

Upon reception of the load completion notification for the third print page (P=3), the page control unit 19 transmits the setup request for the third print page (P=3) to the video control unit 16 (Step S24). The page control unit 19 transmits the print start request for the third print page (P=3) to the engine control unit 15 (Step S25). Upon reception of the setup request for the third print page (P=3), the video control unit 16 starts the setup for the third print page (P=3) (Step S26). Upon reception of the print start request for the third print page (P=3), the engine control unit 15 reads the page data from the video memory 17, and starts the print control for the third print page (P=3) (Step S27).

Meanwhile, immediately after transmitting the setup request and the print start request for the third print page (P=3), the page control unit 19 supplies the load request regarding the fourth print page (P=4) to the main management unit 18a (Step S28). The main management unit 18a identifies a document page corresponding to the fourth print page as the second document page (DP=2) (Step S29). At this time, the record containing the second document page (DP=2) (record added in Step S12) is contained in the process-waiting page list. Therefore, the main management unit 18a ignores the load request, and without issuing a query to the load management unit 18b, transmits the load completion notification to the page control unit 19 (Step S30). Then, the main management unit 18a sets the print page number to "4", and adds a record with the document page number being set to "2" to the process-waiting page list. The process-waiting page list obtained at this time is as illustrated in FIG. 5B.

Upon reception of the load completion notification for the fourth print page (P=4), the page control unit 19 transmits the setup request for the fourth print page (P=4) to the video control unit 16 (Step S31). The page control unit 19 transmits the print start request for the fourth print page (P=4) to the engine control unit 15 (Step S32). Upon reception of the setup request for the fourth print page (P=4), the video control unit 16 starts the setup for the fourth print page (P=4) (Step S33). Upon reception of the print start request for the fourth print page (P=4), the engine control unit 15 reads the page data from the video memory 17, and starts the print control for the fourth print page (P=4) (Step S34).

After that, if the setup for the first print page (P=1) is completed (Step S41), the video control unit 16 transmits a completion notification to the page control unit 19 (Step S42). If the print control for the first print page (P=1) is completed (Step S43), the engine control unit 15 transmits the completion notification to the page control unit 19 (Step S44).

Upon reception of the completion notification for the first print page (P=1) from the video control unit 16 and the engine control unit 15, the page control unit 19 determines that the printing of the first print page (P=1) has been completed. Then, the page control unit 19 transmits a page deletion request for the first print page (P=1) to the main management unit 18a (Step S45). Upon reception of the page deletion request for the first print page (P=1), the main management unit 18a first references the process-waiting page list to identify that the document page corresponding to the first print page (P=1) is the first page (DP=1) (Step S46). The main management unit 18a deletes the record of the first print page (P=1) from the process-waiting page list. The process-waiting page list obtained at this time is as illustrated in FIG. 5C. Further, the process-waiting page list contains another record containing the same document page number ("1" here) of the document page, and hence the main management unit 18a does not transmit the deletion request for the page data on the first document page (DP=1) to the load management unit 18b. The page data on the first document page (DP=1) remains retained in the video memory 17.

After that, if the setup for the second print page (P=2) is completed (Step S51), the video control unit 16 transmits a completion notification to the page control unit 19 (Step S52). If the print control for the second print page (P=2) is completed (Step S53), the engine control unit 15 transmits the completion notification to the page control unit 19 (Step S54).

Upon reception of the completion notification for the second print page (P=2) from the video control unit 16 and the engine control unit 15, the page control unit 19 determines that the printing of the second print page (P=2) has been completed. Then, the page control unit 19 transmits the page deletion request for the second print page (P=2) to the main management unit 18a (Step S55). Upon reception of the page deletion request for the second print page (P=2), the main management unit 18a first references the process-waiting page list to identify that the document page corresponding to the second print page (P=2) is the second page (DP=2) (Step S56). Then, the main management unit 18a deletes the record of the second print page (P=2) from the process-waiting page list. The process-waiting page list obtained at this time is as illustrated in FIG. 5D. Further, the process-waiting page list contains another record containing the same document page number ("2" here) of the document page, and hence the main management unit 18a does not transmit the deletion request for the page data on the second document page (DP=2) to the load management unit 18b. The page data on the second document page (DP=2) remains retained in the video memory 17.

After that, if the setup for the third print page (P=3) is completed (Step S61), the video control unit 16 transmits the completion notification to the page control unit 19 (Step S62). If the print control for the third print page (P=3) is completed (Step S63), the engine control unit 15 transmits the completion notification to the page control unit 19 (Step S64).

Upon reception of the completion notification for the third print page (P=3) from the video control unit 16 and the engine control unit 15, the page control unit 19 determines that the printing of the third print page (P=3) has been completed. Then, the page control unit 19 transmits the page deletion request for the third print page (P=3) to the main management unit 18a (Step S65). Upon reception of the page deletion request for the third print page (P=3), the main management unit 18a first references the process-waiting page list to identify that the document page corresponding to the third print page (P=3) is the first page (DP=1) (Step S66). Then, the main management unit 18a deletes the record of the third print page (P=3) from the process-waiting page list. Further, the process-waiting page list does not contain another record containing the same document page number ("1" here) of the document page, and hence the main management unit 18a transmits the deletion request for the page data on the first document page (DP=1) to the load management unit 18b (Step S67). Upon reception of the deletion request, the load management unit 18b deletes the page data on the first document page (DP=1) from the video memory 17 (Step S68).

After that, if the setup for the fourth print page (P=4) is completed (Step S71), the video control unit 16 transmits the completion notification to the page control unit 19 (Step S72). If the print control for the fourth print page (P=4) is completed (Step S73), the engine control unit 15 transmits the completion notification to the page control unit 19 (Step S74).

Upon reception of the completion notification for the fourth print page (P=4) from the video control unit 16 and the engine control unit 15, the page control unit 19 determines that the printing of the fourth print page (P=4) has been completed. Then, the page control unit 19 transmits the page deletion request for the fourth print page (P=4) to the main management unit 18a (Step S75). Upon reception of the page deletion request for the fourth print page (P=4), the main management unit 18a first references the process-waiting page list to identify that the document page corresponding to the fourth print page (P=4) is the second page (DP=2) (Step S76). Then, the main management unit 18a deletes the record of the fourth print page (P=4) from the process-waiting page list. Further, the process-waiting page list does not contain another record containing the same document page number ("2" here) of the document page, and hence the main management unit 18a transmits the deletion request for the page data on the second document page (DP=2) to the load management unit 18b (Step S77). Upon reception of the deletion request, the load management unit 18b deletes the page data on the second document page (DP=2) from the video memory 17 (Step S78).

As described above, in the case where two copies of a two-page document are printed using the electronic sort process, four pages are printed in the order of the first document page, the second document page, the first document page, and the second document page.

Figure 6:
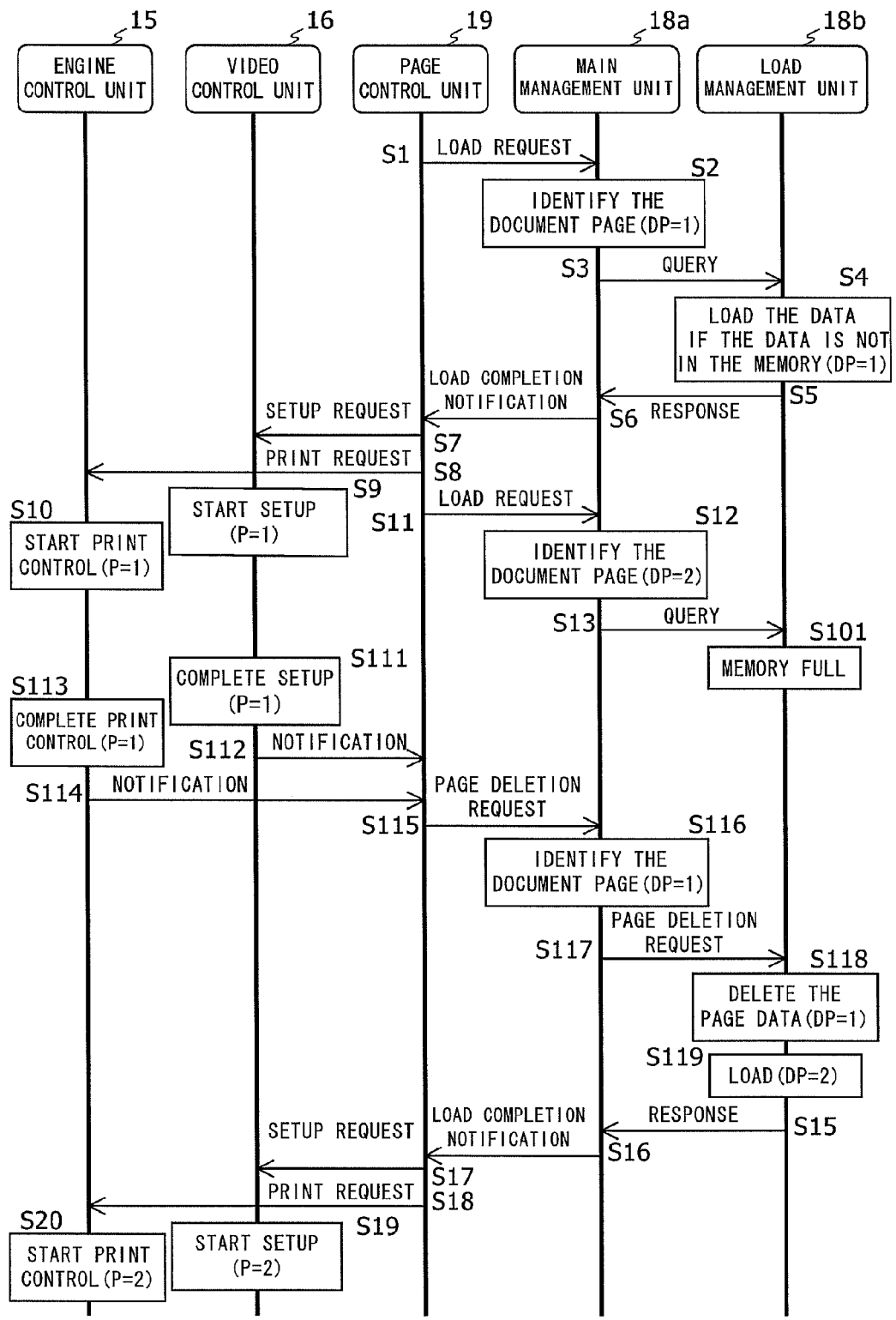
FIG. 6 is a sequence diagram illustrating an example of the electronic sort process performed by the image forming apparatus illustrated in FIG. 1 when the video memory is full.

In the processing illustrated in FIGS. 2 to 4, memory full does not occur in the video memory 17. Next, the operation performed in a case where memory full occurs in the video memory 17 is described. FIG. 6 is a sequence diagram illustrating an example of the electronic sort processing performed by the image forming apparatus illustrated in FIG. 1 in the case where memory full occurs in the video memory 17.

In the same manner as in the case illustrated in FIGS. 2 to 4, the loading of the page data, starting of the setup, and starting of the print control are executed for the first print page (P=1) (Steps S1 to S10).

Next, the main management unit 18a issues a query to the load management unit 18b as to whether or not the page data on the second document page (DP=2) has been loaded in the video memory 17 (Step S13).

Upon reception of the query, the load management unit 18b detects that the size of a free space of the video memory 17 is smaller than the size of the page data on the second document page (that is, memory full) (Step S101). Therefore, the load management unit 18b holds the loading of the page data on the second document page on standby until another page data item loaded in the video memory 17 is deleted to secure enough free space to load the page data on the second document page.

After that, if the setup for the first print page (P=1) is completed (Step S111), the video control unit 16 transmits the completion notification to the page control unit 19 (Step S112). If the print control for the first print page (P=1) is completed (Step S113), the engine control unit 15 transmits the completion notification to the page control unit 19 (Step S114).

Upon reception of the completion notification for the first print page (P=1) from the video control unit 16 and the engine control unit 15, the page control unit 19 determines that the printing of the first print page (P=1) has been completed. Then, the page control unit 19 transmits the page deletion request for the first print page (P=1) to the main management unit 18a (Step S115). Upon reception of the page deletion request for the first print page (P=1), the main management unit 18a first references the process-waiting page list to identify that the document page corresponding to the first print page (P=1) is the first document page (DP=1) (Step S116). Then, the main management unit 18a deletes the record of the first print page (P=1) from the process-waiting page list. Further, the process-waiting page list does not contain another record containing the same document page number ("1" here) of the document page, and hence the main management unit 18a transmits the deletion request for the page data on the first document page (DP=1) to the load management unit 18b (Step S117). Upon reception of the deletion request, the load management unit 18b deletes the page data on the first document page (DP=1) from the video memory 17 (Step S118).

This makes it possible to secure a free space enough to load the page data on the second document page. The load management unit 18b loads the page data on the second document page into the video memory 17 (Step S119). Then, after the page data is loaded into the video memory 17, the load management unit 18b transmits a response to the query to the main management unit 18a (Step S15). Meanwhile, upon reception of the query, if the page data on the second document page has already been loaded in the video memory 17, the load management unit 18b immediately transmits the response to the query to the main management unit 18a (Step S15). Upon reception of the query regarding the page data on the second document page from the load management unit 18b, the main management unit 18a transmits the load completion notification to the page control unit 19 (Step S16).

Therefore, if the video memory 17 is full, the page data for one page is deleted upon the completion of the printing, and then another page data item is loaded. Even if memory full occurs, the printing under the electronic sort process is continuously executed.

As described above, according to the above-mentioned embodiment, the load management unit 18b loads the page data on the print image into the video memory 17 page by page. As part of the electronic sort process, when the printing of a given page is completed, the main management unit 18a does not delete the page data on the given page from the video memory 17 if there is a subsequent page to be printed using the same page data as that on the given page. If there is no subsequent page to be printed using the same page data as that on the given page, the main management unit 18a deletes the page data on the given page from the video memory 17.

Figure 7:
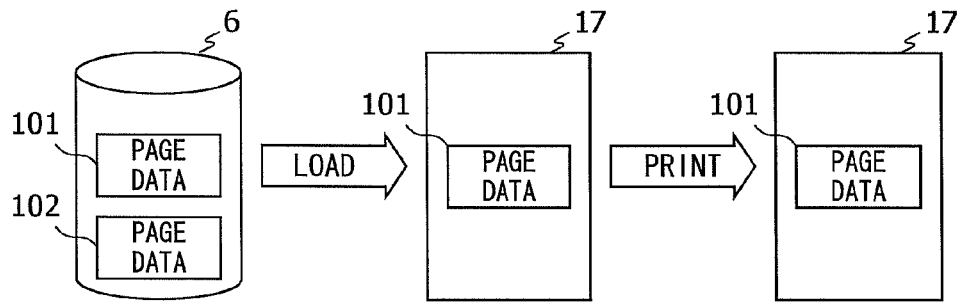
FIG. 7 is a diagram illustrating an example of a data flow of page data at a time when the electronic sort process is performed by the image forming apparatus illustrated in FIG. 1.
Figure 7:
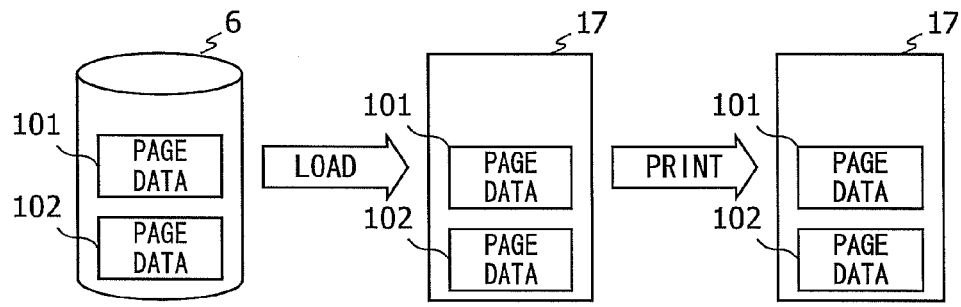
Figure 7:
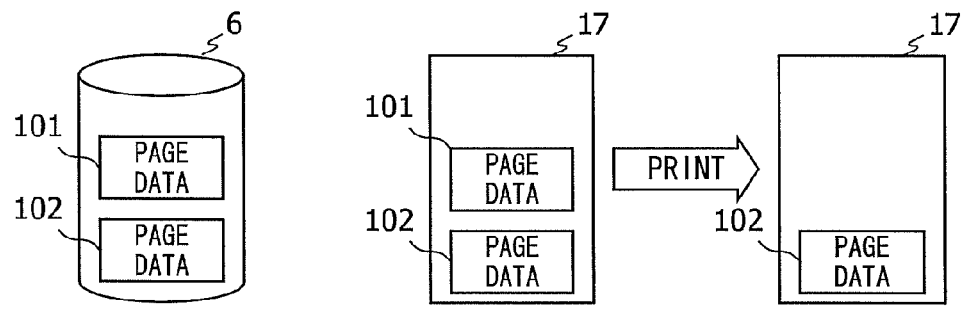
Figure 7:
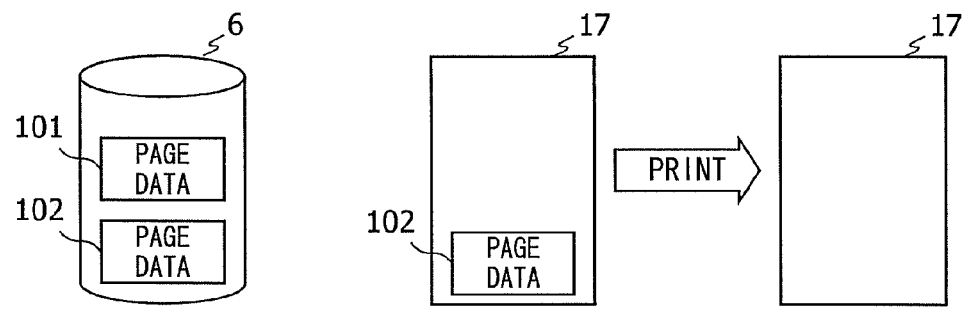

For example, FIG. 7 illustrates the case where two copies of a two-page document are printed using the electronic sort process. With regard to the first print page and the second print page, the load management unit 18b loads page data items 101 and 102 on print images into the video memory 17 page by page. When the printing of a given page is completed, the subsequent page to be printed using the same page data as that on the given page exists, and hence the main management unit 18a does not delete the page data on the given page from the video memory 17. With regard to the third print page and the fourth print page, the page data items 101 and 102 have already been loaded, and hence the load management unit 18b does not load the page data items 101 and 102 into the video memory 17. When the printing of a given page is completed, the subsequent page to be printed using the same page data as that on the given page does not exist, and hence the main management unit 18a deletes the page data on the given page from the video memory 17.

The process illustrated in FIG. 7 allows a reduction of the number of times the page data is loaded. Accordingly, it is possible to use the electronic sort process to carry out a print request in a shorter amount of time.

Note that the above-mentioned embodiment is a preferred example of the present invention, but the present invention is not limited to this embodiment. Various modifications and changes can be made without departing from the spirit and scope of the present subject matter and without diminishing its intended advantages.

For example, the above-mentioned embodiment illustrates the example in which two copies of a two-page document are printed using the electronic sort process, but the number of pages and the number of copies are merely examples. For example, the document may have three or more pages, or three or more copies may be printed using the electronic sort process. Even in such cases, the processing can be executed in the same manner.

As another example, in the above-mentioned embodiment, the page data on the first print page may be stored into the video memory 17 from the data processing unit 20 via the data management unit 18 without being temporarily stored in the storage device 6.

The present invention may be applied to any image forming apparatus including, for example, a printer, a copier, a facsimile machine, or a multifunction peripheral.

What is claimed is:

1. An image forming apparatus, comprising: a video memory;
   a load management unit that loads page data on a print image into the video memory page by page;
   a print engine that performs printing using the page data stored in the video memory; and
   a main management unit that, when the printing of a page is part of an electronic sort process, causes the video memory to retain the page data if there is a subsequent page to be printed using the page data, and deletes the page data from the video memory if there is no subsequent page to be printed using the page data;
   a page control unit that issues a load request for the page data page by page, wherein if page data on a page specified by the load request has not been loaded in the video memory, the main management unit causes the load management unit to load the page data specified by the load request into the video memory, and if the page data specified by the load request has been loaded in the video memory, the main management unit ignores the load request;
   wherein the main management unit registers, in a list, a record indicating a correlation between a print page number and a document page number specified in the load request, wherein the print page number represents a serial number of a print page, and the document page number represents a page number of the page data used for the printing; and
   when the load request is issued, if the document page number specified in the load request is not registered in the list, the main management unit causes the load management unit to load the page data corresponding to the document page number into the video memory, and if the document page number specified in the load request has already been registered in the list, the main management unit ignores the load request.

2. The image forming apparatus according to claim 1, wherein the page control unit issues the load request for a page, and, once the loading of the page data is completed, issues a next load request for a next page.

3. The image forming apparatus according to claim 2, wherein if the loading of the page data for a document page number corresponding to a print page number is completed, the print engine executes the printing based on the page data.

4. The image forming apparatus according to claim 1, further comprising a page control unit that issues a load request for the page data page by page, wherein:
   the main management unit registers, in a list, a record indicating a correlation between a print page number and a document page number specified in the load request, wherein the print page number represents a serial number of a print page, and the document page number represents a page number of the page data used for the printing;
   when the printing of a page is completed, the main management unit deletes the record of the print page number of the page from the list; and
   at that time, the main management unit causes the video memory to retain the page data if there is a record having the same document page number as a document page number of the page within the list, and deletes the page data from the video memory if there is no record having the same document page number as the document page number of the page within the list.

5. The image forming apparatus according to claim 1, wherein when a size of a free space of the video memory is smaller than a size of the page data, the load management unit holds loading of the page data on standby until a free space larger than the size of the page data is available in the video memory.

6. The image forming apparatus according to claim 1, further comprising a storage device that saves the page data on the print image,
   wherein the load management unit loads the page data on the print image from the storage device into the video memory page by page.

7. The image forming apparatus according to claim 1, further comprising:
   an engine control unit that controls the print engine; and a video control unit that performs setup for the page data, wherein when the loading corresponding to the load request is completed, the page control unit transmits a setup request to the video control unit, and transmits a print start request to the engine control unit.

8. An image forming method, comprising:
   a loading step of loading page data on a print image into a video memory page by page;
   a printing step of printing using the page data stored in the video memory; and
   a video memory management step of, when printing of a page is completed, retaining the page data if there is a subsequent page to be printed using the same page data as that on the page, and deleting the page data from the video memory if there is no subsequent page to be printed using the same page data as that on the page;
   a page control step of issuing a load request for the page data page by page, wherein the video memory management step comprises:
   if page data on a page specified by the load request has not been loaded in the video memory, loading the page data specified by the load request into the video memory; and
   if the page data specified by the load request has been loaded in the video memory, ignoring the load request;
   video memory management step further comprises registering, in a list, a record indicating a correlation between a print page number and a document page number specified in the load request, the print page number representing a serial number of a print page, and the document page number representing a page number of the page data used for the printing; and
   when the load request is issued, the video memory management step comprises:
   if the document page number specified in the load request is not registered in the list, loading the page data corresponding to the document page number into the video memory; and
   if the document page number specified in the load request has already been registered in the list, ignoring the load request.

9. The image forming method according to claim 8, wherein the page control step comprises issuing the load request for a page, and immediately after the loading of the page data is completed, issuing the load request for a next page.

10. The image forming method according to claim 9, wherein if the loading of the page data for a document page number corresponding to a print page number is completed, the printing step comprises executing the printing based on the page data.

11. The image forming method according to claim 8, further comprising a page control step of issuing a load request for the page data page by page, wherein:
   the video memory management step further comprises registering, in a list, a record indicating a correlation between a print page number and a document page number specified in the load request, the print page number representing a serial number of a print page, the document page number representing a page number of the page data used for the printing;
   when the printing of a page is completed, the video memory management step further comprises deleting the record of the print page number of the page from the list; and
   at that time, the video memory management step further comprises retaining the page data if there is a record having the same document page number as a document page number of the page within the list, and deleting the page data from the video memory if there is no record having the same document page number as the document page number of the page within the list.

12. The image forming method according to claim 8, wherein when a size of a free space of the video memory is smaller than a size of the page data, the loading step comprises holding loading of the page data on standby until a free space larger than the size of the page data is available in the video memory.

13. The image forming method according to claim 8, wherein the loading step comprises loading the page data on the print image from a storage device that saves the page data on the print image into the video memory page by page.

14. The image forming method according to claim 8, wherein the page control step comprises starting setup for the print page when the loading corresponding to the load request is completed, and starting print control.

15. An image forming method, comprising:
   receiving a first request for loading into a load management unit a first print page;
   in response to the first request, identifying a first document page corresponding to the first print page;
   recording in a process-waiting page list a first record correlating the first document page with the first print page;
   loading the first print page;
   subsequently receiving into the load management unit a second request for loading a second print page;
   in response to the second request, identifying a second document page corresponding to the second print page;
   recording in the process-waiting page list a second record correlating the second document page with the second print page; and subsequently, determining if the first document page and the second document page are the same, and if not, then loading the second print page, and if so, then not loading the second print page;
   a page control step of issuing a load request for the page data page by page, wherein the video memory management step comprises:
   if page data on a page specified by the load request has not been loaded in the video memory, loading the page data specified by the load request into the video memory; and
   if the page data specified by the load request has been loaded in the video memory, ignoring the load request;
   video memory management step further comprises registering, in a list, a record indicating a correlation between a print page number and a document page number specified in the load request, the print page number representing a serial number of a print page, and the document page number representing a page number of the page data used for the printing; and
   when the load request is issued, the video memory management step comprises:
   if the document pane number specified in the load request is not registered in the list, loading the page data corresponding to the document page number into the video memory; and
   if the document page number specified in the load request has already been registered in the list, ignoring the load request.

* * * * *